Oct. 9, 1928.  1,687,207
W. S. HAWKER
DOWEL PIN AND METHOD OF MANUFACTURE
Filed Jan. 26, 1926
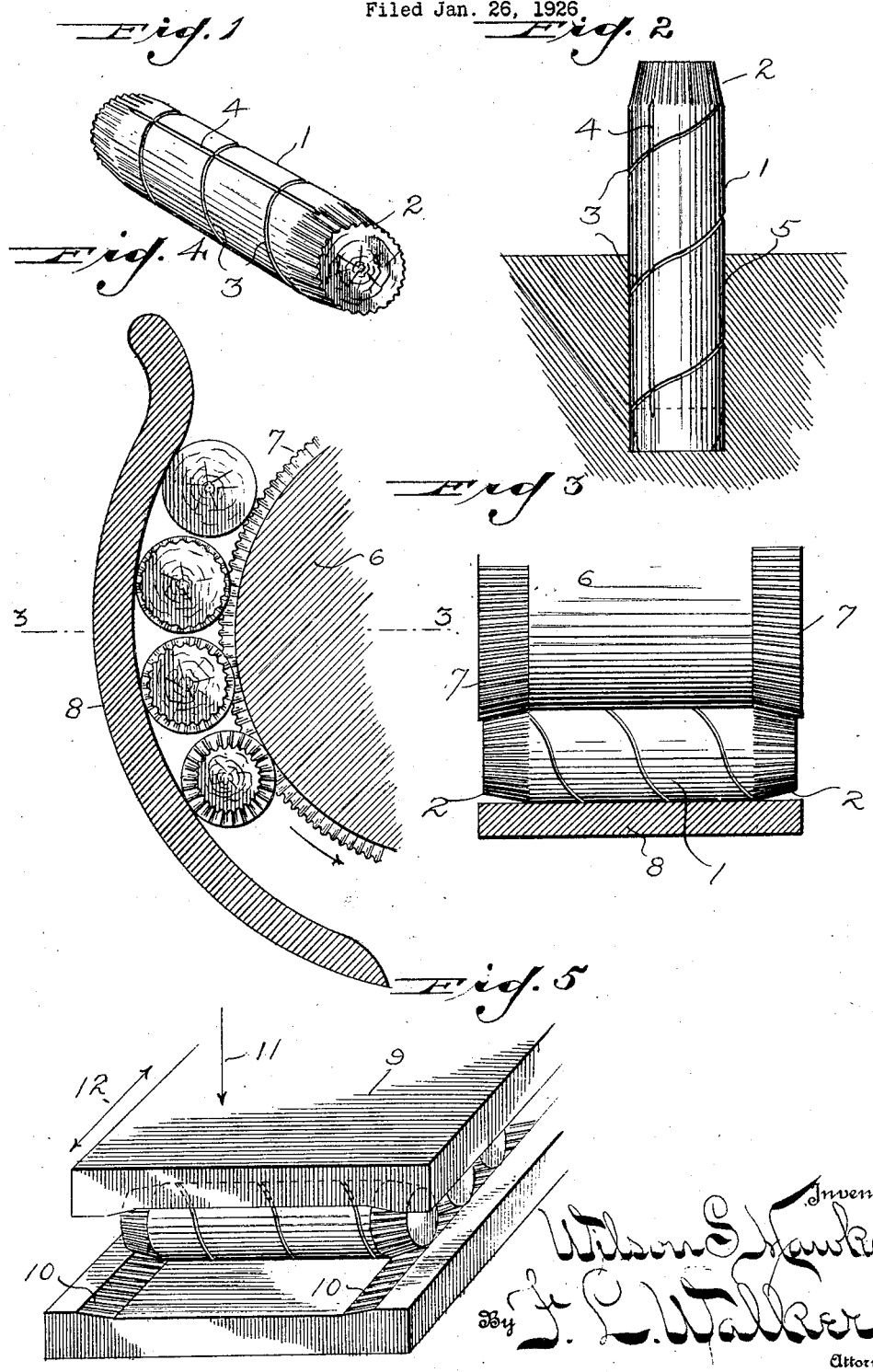

Patented Oct. 9, 1928.

1,687,207

UNITED STATES PATENT OFFICE.

WILSON S. HAWKER, OF DAYTON, OHIO.

DOWEL PIN AND METHOD OF MANUFACTURE.

Application filed January 26, 1926. Serial No. 83,842.

My invention relates to dowel pins and more particularly to the method of tapering or reducing the ends of the dowel pins to facilitate their introduction into receiving holes or sockets.

In the manufacture of furniture and other structures wherein wooden dowel pins are employed, it is not only desirable but quite necessary that the dowel pin shall closely and tightly fit the hole or socket, into which it is driven. For economical commercial production, particularly in those establishments wherein dowel driving devices are employed, it is equally important that the dowel be easily and readily entered into the receiving hole or socket. To this end, it has been quite the common practice to chamfer or taper the ends of the dowel pin. Usually this tapering is effected by the removal of stock, which materially reduces the effective length of the dowel pin, leaving about such tapered extremity within the hole or socket, an annular recess intermediate the tapered end of the dowel and the wall of the hole and socket. The reduction of the effective length of the dowel pin or the contact bearing of the pin with the wall of the hole becomes quite a serious matter in the manufacture of light furniture, or structures having comparatively thin parts to be connected by such dowel pin. By the present invention, there is contemplated the utilization of the full length of the dowel pin, by compressing the ends of the pin to form the taper or lead to facilitate its introduction into the hole, so that no material is removed. Such compressed tapered end adapted to expand by the absorption of moisture from the warm glue, so that after its introduction, the expanded pin will completely fill the hole or socket. It is known that heretofore it has been proposed to chamfer wooden dowel pins by thrusting them forcibly into a cone shaped die, or by striking such cone shaped die over the end of the dowel pin. Such method, however, was adapted to produce only a very abrupt chamfer or inclination, since if the taper was elongated, the dowel pin would become wedged within the conical die and could not be withdrawn. Moreover, this die method of compression by impact serves to compress only the extreme outermost fiber of the pin with a tendency to break such distorted and compressed fiber, thus weakening the surface of the pin and impairing its adhesive contact with the wall of the hole. The present invention involves the tapering of the dowel pins by rolling the pins in contact with a beveled or tapered forming member, under gradually increasing tension, so that the taper is effected not only without the removal of stock, but the compression is effected to much greater depth without the abrupt distortion and fracture of the fiber of the pin. Instead of compressing the thin external stratum of the fibers densely and hard as in the die compression method, the compression by rolling compresses and condenses the fibers quite deeply in the body of the pin, without making the exterior stratum of fibers so dense and hard as to resist absorption of moisture. In the present case the facility for absorption of moisture, by which the tapered portion of the pin is expanded subsequent to its insertion into the receiving hole, is materially increased by providing longitudinal corrugations in the tapered surface. These longitudinal corrugations materially increase the area of the tapered portion of the pin and moreover, tend to attract and hold the moisture to effect the expansion of the compressed ends of the pin after being driven into the receiving holes.

In the accompanying drawing, wherein is illustrated the preferred, but not necessarily the only from of embodiment of the invention, and the method of producing the tapered pin by a rolling operation, Fig. 1 is a perspective view of a completed pin. Fig. 2 is a side elevation partly in section, illustrating the pin driven into a receiving hole and showing by dotted lines, the original taper or contour of pin, prior to expansion. Figs. 3 and 4 illustrate more or less diagrammatically, a manner of forming the tapered ends of the pin by rolling. Fig. 5 further illustrates the method of manufacture by rolling under pressure.

Like parts are indicated by similar characters of reference throughout the several views.

In Fig. 1 of the drawing there is shown the dowel pin which forms the subject matter hereof, and which consists of a cylindrical body 1 tapered at its opposite ends as at 2—2. The main or intermediate portion of the dowel pin body is shown provided with a helical glue distributing groove 3 and with a longitudinal vent groove 4. These glue distributing and vent grooves 3 and 4 form no part of the present invention, but are the conventional features of dowel pins now in use. The tapered ends 2—2 of the pin provide the necessary lead to facilitate the introduction of the pin into a hole or socket as at 5 in Fig. 2. These tapered ends 2—2 are longitudinally corrugated or formed with a somewhat crenate surface contour, which materially increases the surface area and facilitate the retention and absorption of moisture by which these tapered ends are subsequently expanded.

To form such corrugated or crenate tapered ends, no stock is removed but the ends of the cylindrical body 1 are subjected to rolling pressure by which these ends are progressively compressed. Various forms of apparatus may be devised for effecting such rolling pressure. One of the most simple and yet quite efficient means for carrying out this method or process is that illustrated in Figs. 3 and 4, wherein 6 is a roll or drum revolving at comparatively slow speed. This roll or drum 6 is provided at its opposite ends with inclined or tapered flanges 7—7. The flanges 7 are knurled or corrugated not only to impress or indent the surface of the dowel pin, but also to afford a secure and positive driving contact therewith. Located in slightly eccentric spaced relation with the face of the roll or drum 6 is a curved plate 8. This plate 8 at its upper end is spaced away from the drum or roll 6 a sufficient distance to easily admit the uncompressed dowel pin between the plate and the periphery of the roll. Such dowel pins having been previously turned to the proper diameter and cut to the required length are introduced into the throat intermediate the drum 6 and plate 8. At their point of introduction, these uncompressed pin sections engage only the outer margins of the tapered or inclined flanges 7. However, as the roll or drum rotates in the direction of the arrow in Fig. 4, these pin sections are carried downwardly within the throat intermediate the roll or drum and plate, and as the throat or intermediate space therebetween gradually contracts these pins are subjected to gradually increasing pressure. In the meantime the pin is being rotated or rolled upon the interior of the concave plate 8, by the driving engagement of the drum or roll 6. The rotation of the pin brings every portion of the periphery of the pin into contact with the corrugated or knurled tapered flanges 7—7 of the drum 6, so that the pin is progressively compressed on all sides. This pressure progresses uniformly from a light or initial pressure at the upper end of the plate to a greatly increased pressure at the lower or discharge end of such plate. As result, the fiber of the wooden pin is gradually and easily displaced or compressed, the area of compression extending quite deeply into the pin or body, so that though the tapered ends are considerably reduced in size, this compression is more or less uniform through the diameter of the pin and is not a compression which is concentrated in the outermost stratum. Therefore, the compression of the pin does not render its surface impervious to the absorption of moisture as is the case when the pin is compressed under high pressure only upon its surface, thus making the surface dense and hard. Merely as illustrative of another method of tapering the pin it is shown in Fig. 5 as being rolled between relatively reciprocating channeled plates 9—9, the flanges 10 of which are tapered and corrugated. By subjecting these plates to pressure as indicated by the arrow 11, and at the same time reciprocating the plates to and fro as indicated at 12, the dowel pins 1 will be rolled intermediate the plates into conformity with the tapered corrugated flanges 10.

It is customary in inserting dowel pins to coat the surface of the pin with glue or cement. Such cement or glue will ordinarily afford sufficient moisture to expand or swell the compressed ends 2—2. However, if such should not be the case, the pin may be dipped into water immediately before being inserted in the receiving hole or socket 5. The absorption of moisture by the compressed tapered ends, causes these ends to swell to their original size before compression and therefore, completely fill and conform to the interior of the receiving hole or socket 5. The corrugated or crenate surface increases the surface area of the pin which is subject to the expanding moisture, and furthermore, such corrugations tend to retain and hold the applied moisture, thus facilitating and increasing the expansive tendency of these compressed ends after their insertion in the receiving hole or socket.

Whereas, the effective length of a dowel pin is materially decreased by tapering or pointing when surplus stock is removed, the present process renders the full length of the pin effective.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect, and the invention is, therefore, claimed in any of its forms or modifications within the legitimate and valid scope of the appended claims.

Having thus described my invention, I claim:

1. The herein described method of pointing dowel pins by simultaneously rolling the opposite ends of the pin under pressure in contact with a corrugated former to compress the ends to tapered corrugated form.

2. As an article of manufacture, a dowel pin having its ends compressed and longitudinally corrugated and an intermediate uncompressed body portion to follow said compressed ends into receiving sockets.

3. As an article of manufacture a cylindrical dowel pin, the end portion of which is compressed to tapered form, the tapered surface being compressed to alternating greater and less degree at peripherally spaced intervals to produce therein a succession of longitudinally disposed corrugations.

4. As an article of manufacture, a dowel pin comprising a cylindrical body, the end of which is compressed to acutely tapered form and longitudinally corrugated.

5. As an article of manufacture a dowel pin of cylindrical form having a compressed elongated tapered end, such tapered compressed portion being longitudinally corrugated.

6. The herein described method of tapering dowel pins consisting in simultaneously rolling the opposite ends of a section of dowel stock between corrugated compressors having their corrugations extending in inclined relation to the axis of rotation of the stock and subjecting the rolled ends to gradually increasing pressure, of alternating greater and less degree at peripherally spaced intervals thereby producing a longitudinally corrugated tapered surface.

7. The herein described method of tapering dowel pins consisting in compressing the ends to tapered form by simultaneously rolling the opposite ends of the pin under gradually increasing pressure applied in greater degree at peripherally spaced intervals whereby the compressed tapered portion is longitudinally corrugated.

In testimony whereof, I have hereunto set my hand this 16th day of January, A. D. 1926.

WILSON S. HAWKER.